United States Patent
Hatfield

(10) Patent No.: US 7,735,256 B2
(45) Date of Patent: Jun. 15, 2010

(54) FISH LURE BREAK AWAY SYSTEM

(76) Inventor: Marcus Craig Hatfield, 3 Oriole Way, Morgantown, WV (US) 26508

(\*) Notice: Subject to any disclaimer, the term of this patent is extended or adjusted under 35 U.S.C. 154(b) by 0 days.

(21) Appl. No.: 12/205,524

(22) Filed: Sep. 5, 2008

(65) Prior Publication Data

US 2010/0058642 A1    Mar. 11, 2010

(51) Int. Cl.
 A01K 85/02    (2006.01)
 A01K 91/03    (2006.01)
 A01K 91/04    (2006.01)
(52) U.S. Cl. .................. 43/43.12; 43/44.83; 43/17.2
(58) Field of Classification Search ............. 43/43.12, 43/44.83, 44.97, 17.2
 See application file for complete search history.

(56) References Cited

U.S. PATENT DOCUMENTS

| | | | | |
|---|---|---|---|---|
| 794,695 A * | 7/1905 | Bagnall | ............ | 63/21 |
| 1,497,710 A * | 6/1924 | Cole | ............ | 24/577.1 |
| 1,974,381 A * | 9/1934 | Swanson et al. | ............ | 43/43.12 |
| 2,138,702 A * | 11/1938 | Litsey | ............ | 43/44.83 |
| 2,359,588 A * | 10/1944 | Shea | ............ | 43/43.12 |
| 2,573,981 A * | 11/1951 | Nelson | ............ | 43/43.12 |
| 2,619,763 A * | 12/1952 | Siebert | ............ | 43/42.43 |
| 2,651,134 A * | 9/1953 | Kemmerer | ............ | 43/43.4 |
| 2,727,332 A * | 12/1955 | Benson | ............ | 43/44.97 |
| 2,733,537 A * | 2/1956 | Elsberg | ............ | 43/43.12 |
| 2,756,478 A * | 7/1956 | Morrissey | ............ | 24/908 |
| 2,768,468 A * | 10/1956 | Kibler et al. | ............ | 43/43.12 |
| 2,775,057 A * | 12/1956 | Ludgate | ............ | 43/43.12 |
| 2,796,695 A * | 6/1957 | Meulnart | ............ | 43/44.86 |
| 2,839,803 A * | 6/1958 | Wiselka | ............ | 24/908 |
| 2,871,540 A * | 2/1959 | Smith | ............ | 43/44.83 |
| 3,077,694 A * | 2/1963 | Cox | ............ | 43/43.12 |
| 3,091,885 A * | 6/1963 | Ulsh | ............ | 43/42.52 |
| 3,210,883 A * | 10/1965 | Ulsh | ............ | 43/43.12 |
| 3,218,751 A * | 11/1965 | Walker | ............ | 43/43.12 |
| 3,518,784 A * | 7/1970 | Moss et al. | ............ | 43/43.12 |
| 3,541,720 A * | 11/1970 | Buffet | ............ | 43/43.12 |
| 3,648,399 A * | 3/1972 | Lloyd | ............ | 43/43.12 |
| 3,683,542 A * | 8/1972 | Pecchio | ............ | 43/44.97 |
| 3,724,116 A * | 4/1973 | Lindner et al. | ............ | 43/44.83 |
| 3,778,918 A * | 12/1973 | Emory et al. | ............ | 43/43.12 |
| 3,785,011 A * | 1/1974 | Marks | ............ | 43/44.83 |
| 3,991,505 A * | 11/1976 | Simeti | ............ | 43/43.12 |
| 4,010,569 A * | 3/1977 | Finley et al. | ............ | 43/44.83 |
| 4,125,958 A * | 11/1978 | Cote | ............ | 43/43.12 |

(Continued)

FOREIGN PATENT DOCUMENTS

GB    2100103 A  *  12/1982

(Continued)

*Primary Examiner*—Darren W Ark
(74) *Attorney, Agent, or Firm*—Christopher Wood; Daniel Eisenberg; Wood & Eisenberg, PLLC

(57) ABSTRACT

A fish lure break away system, having a lure attachment member, a hook section with at least one elongated shank, an eyelet, an eyelet guide, and a least one curved bend terminating in a tip section. The eyelet defines an eyelet gap having a predetermined width. In one embodiment the lure attachment member has a predetermined breaking strength in combination with a selected thickness and a selected flexibility such that the lure attachment member can be squeezed by a user through the eyelet gap and thereby attached to the eyelet.

8 Claims, 12 Drawing Sheets

U.S. PATENT DOCUMENTS

| | | | | |
|---|---|---|---|---|
| 4,141,116 | A * | 2/1979 | Zalonis | 43/44.83 |
| 4,171,587 | A * | 10/1979 | Bullen, Jr. | 43/17.2 |
| 4,215,505 | A * | 8/1980 | Henze et al. | 43/43.1 |
| 4,494,334 | A * | 1/1985 | Porter | 43/43.12 |
| 4,538,372 | A * | 9/1985 | Petigoretz | 43/43.12 |
| 4,642,933 | A * | 2/1987 | Brown | 43/43.12 |
| 4,691,467 | A * | 9/1987 | Brimmer | 43/44.4 |
| 4,696,121 | A * | 9/1987 | Hernden | 43/17.2 |
| 4,821,449 | A * | 4/1989 | Hafer | 43/43.12 |
| 5,076,006 | A * | 12/1991 | Kahng | 43/43.12 |
| 5,165,197 | A * | 11/1992 | Sitton | 43/44.83 |
| 5,212,901 | A * | 5/1993 | Bishop et al. | 43/42.72 |
| 5,351,434 | A * | 10/1994 | Krenn | 43/44.91 |
| 5,375,365 | A * | 12/1994 | Bronder | 43/43.12 |
| 5,499,472 | A * | 3/1996 | Krenn | 43/44.97 |
| D376,836 | S * | 12/1996 | Banks et al. | D22/144 |
| 5,579,600 | A * | 12/1996 | Burns | 43/44.83 |
| 5,901,495 | A * | 5/1999 | Leigeber | 43/43.12 |
| 5,970,650 | A * | 10/1999 | Mammel | 43/44.83 |
| 6,073,385 | A * | 6/2000 | Sano | 43/44.83 |
| 6,076,297 | A * | 6/2000 | Lippincott | 43/44.87 |
| 6,189,256 | B1 * | 2/2001 | Boys | 43/43.12 |
| 6,192,619 | B1 * | 2/2001 | Pirkle | 43/43.12 |
| 6,305,120 | B1 * | 10/2001 | Boys | 43/43.12 |
| D451,579 | S | 12/2001 | Yong-Set | |
| 6,334,273 | B2 * | 1/2002 | Turner et al. | 43/44.83 |
| 6,460,225 | B1 * | 10/2002 | Brault | 24/115 F |
| 6,560,916 | B1 * | 5/2003 | Maxim | 43/44.83 |
| 6,722,079 | B2 * | 4/2004 | Schumer | 43/17.2 |
| 6,748,694 | B1 * | 6/2004 | Darling | 43/43.12 |
| 6,760,997 | B1 * | 7/2004 | Mammel | 43/44.83 |
| D501,039 | S * | 1/2005 | Duncan | D22/144 |
| 7,197,847 | B2 * | 4/2007 | Albrant, Jr. | 43/43.12 |
| 7,621,072 | B2 * | 11/2009 | Brasseur | 43/44.97 |
| D609,304 | S * | 2/2010 | Hatfield | D22/144 |
| 7,669,360 | B2 * | 3/2010 | Davidson | 43/43.12 |
| 7,676,984 | B2 * | 3/2010 | Mark | 43/42.72 |
| 2003/0051390 | A1 * | 3/2003 | Boys | 43/43.12 |
| 2006/0090390 | A1 * | 5/2006 | Barth | 43/43.12 |
| 2006/0185221 | A1 * | 8/2006 | Burns | 43/44.83 |
| 2006/0196105 | A1 * | 9/2006 | Michlitsch | 43/44.83 |
| 2006/0218847 | A1 * | 10/2006 | Otsubo | 43/44.83 |
| 2006/0265939 | A1 * | 11/2006 | Friedrichs | 43/44.83 |
| 2007/0119092 | A1 * | 5/2007 | Gruber | 43/44.83 |
| 2007/0227060 | A1 * | 10/2007 | Mammel | 43/44.83 |
| 2009/0313878 | A1 * | 12/2009 | Taylor | 43/44.83 |
| 2010/0024277 | A1 * | 2/2010 | Ross | 43/44.83 |

FOREIGN PATENT DOCUMENTS

| | | | |
|---|---|---|---|
| GB | 2344734 A | * | 6/2000 |
| JP | 04166031 A | * | 6/1992 |
| JP | 08277829 A | * | 10/1996 |
| JP | 08280306 A | * | 10/1996 |
| JP | 09275863 A | * | 10/1997 |
| JP | 10084825 A | * | 4/1998 |
| JP | 10210905 A | * | 8/1998 |
| JP | 10276640 A | * | 10/1998 |
| JP | 11169023 A | * | 6/1999 |
| JP | 2002204642 A | * | 7/2002 |
| JP | 2003079278 A | * | 3/2003 |
| JP | 2003210087 A | * | 7/2003 |
| JP | 2004236519 A | * | 8/2004 |
| WO | WO 9749280 A1 | * | 12/1997 |
| WO | WO 9834475 A1 | * | 8/1998 |
| WO | WO 03067975 A1 | * | 8/2003 |
| WO | WO 2006127029 A2 | * | 11/2006 |

* cited by examiner

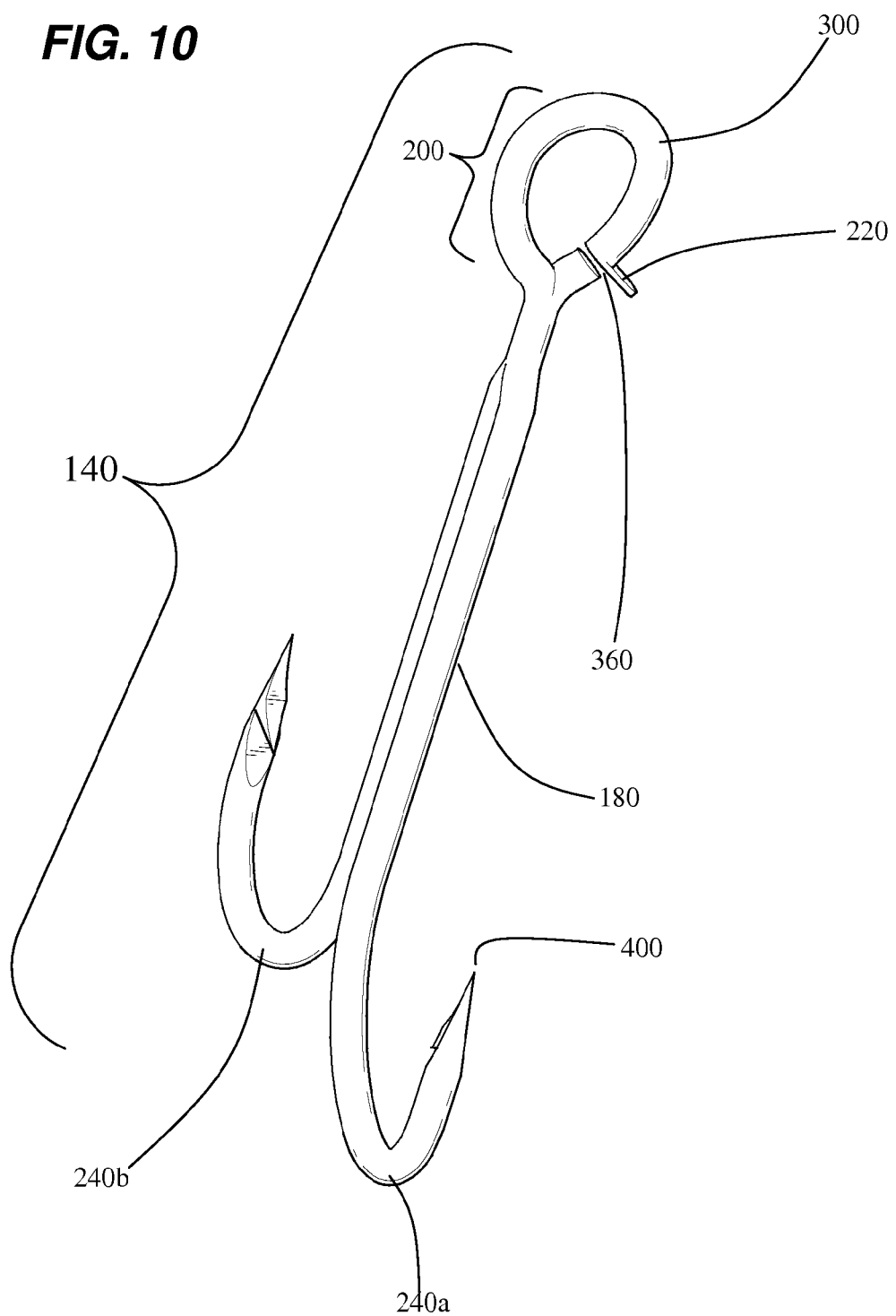

| TABLE 1 ||
|---|---|
| 100 | fish lure break away system 100 |
| 120 | lure attachment member 120 of predetermined breaking strength |
| 140 | hook section 140 |
| 145 | lure ring 145, can be a lure split ring |
| 150 | artificial fish lure 150 |
| 155 | fishing line 155 |
| 180 | at least one elongated shank 180 |
| 200 | eyelet 200 |
| 220 | eyelet guide 220 |
| 240 | at least one curved bend 240; for double curved bends labeled: 240a and 240b (e.g., see Figure 10); for treble curved bends labeled: 240a, 240b, and 240c (e.g., see Figure 4). |
| 260 | first end 260 of elongated shank 180 |
| 280 | second end 280 of elongated shank 180 |
| 300 | eyelet 200 defines a discontinuous loop 300 |
| 320 | first end 320 of discontinuous loop 300 |
| 340 | second end 340 of discontinuous loop 300 |
| 360 | eyelet gap 360 |
| 380 | tip section 380 |
| 400 | sharp point 400 |
| 420 | barb 420 |

FISH LURE BREAK AWAY SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to an apparatus for sport fishing and particularly, to a breakaway hook and loop system which helps prevent the loss of a fish lure when the hook becomes snagged.

BACKGROUND OF THE INVENTION

As noted in U.S. Pat. No. 4,696,121, sport fishermen have long been plagued with losing fishing lures when the hook becomes entangled with underwater objects. Normally, when such entanglement occurs, the fisherman cuts the fishing line or tries to pull it free until the fishing line fails resulting in a loss of the lure. The potential for such loss necessitates that the angler must bring a number of lures with him during a fishing outing. Moreover, loss of lures translates into a loss of a considerable sum of money over the course of a fishing season.

There is a need for better ways of reducing the risk of losing fishing lures.

BRIEF DESCRIPTION OF THE DRAWINGS

FIG. 10 shows a perspective view of a hook section according to the present invention.

FIG. 11 shows a table listing part numbers.

SUMMARY OF THE INVENTION

A fish lure break away system, having a lure attachment member, a hook section with at least one elongated shank, an eyelet, an eyelet guide, and a least one curved bend terminating in a tip section. The eyelet defines an eyelet gap having a predetermined width. In one embodiment the lure attachment member has a predetermined breaking strength in combination with a selected thickness and a selected flexibility such that the lure attachment member can be squeezed by a user through the eyelet gap and thereby attached to the eyelet.

DETAILED DESCRIPTION OF THE INVENTION

This invention is directed to a fish lure break away system. The fish lure break away system of the invention is denoted generally by the numeric label "100".

Referring to the Figures in general and Table 1 (see FIG. 11), the fish lure break away system 100 comprises a lure attachment member 120 and a hook section 140 adapted to attach directly to the lure attachment member 120 as described below. In normal use the lure attachment member 120 is used to attach the hook section 140 to an artificial fish lure 150.

Figure 3A:
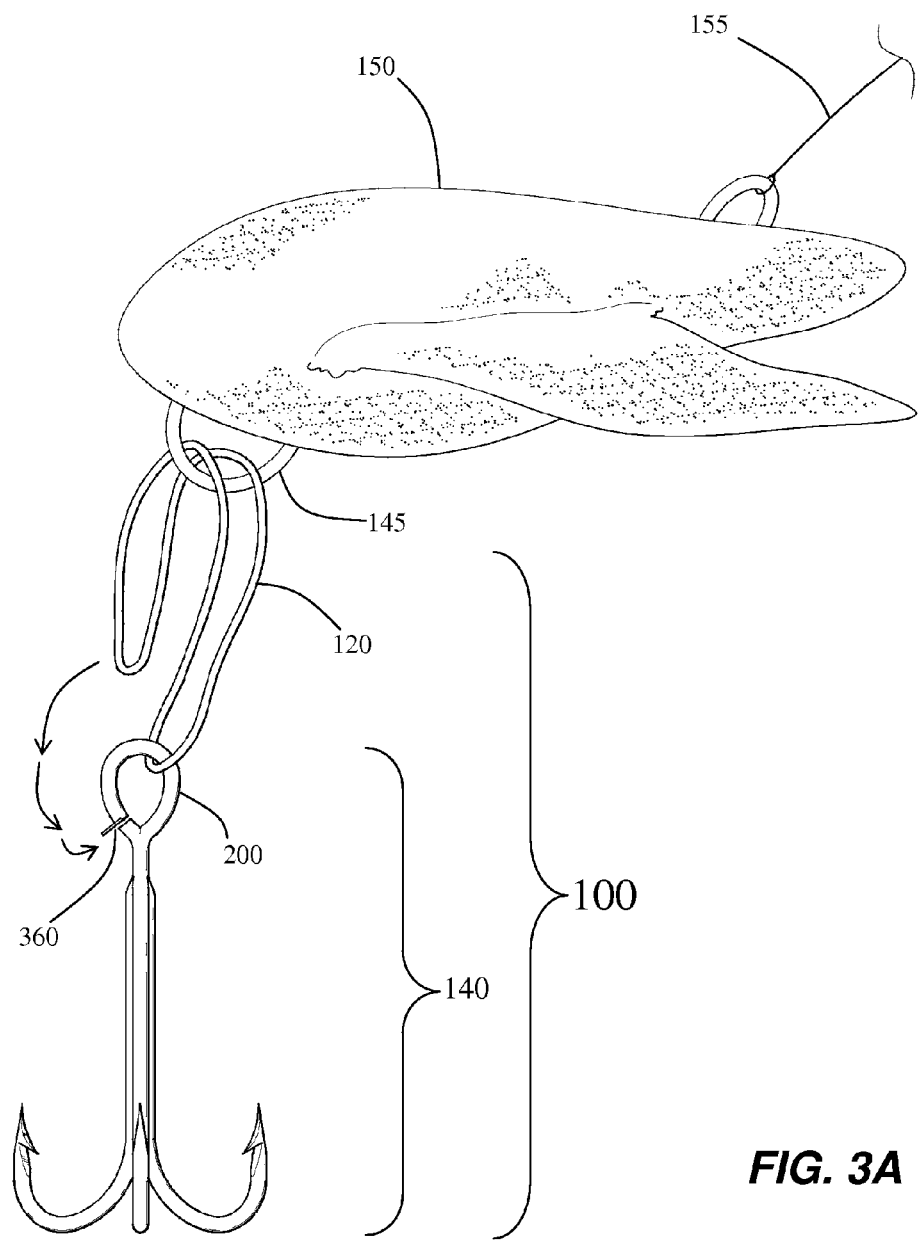
FIG. 3A shows an environmental view of a hook section according to the present invention.
Figure 3B:
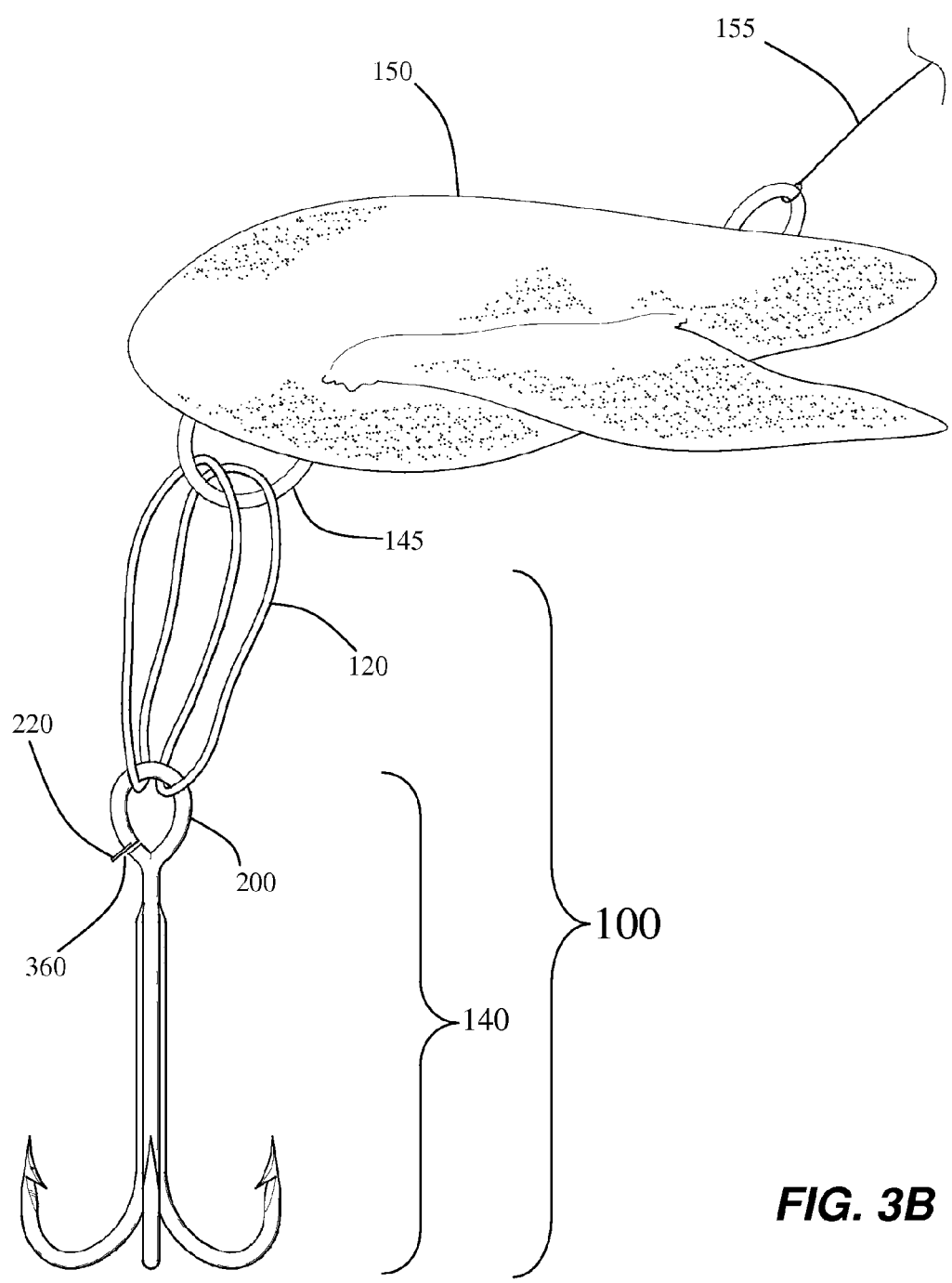
FIG. 3B shows an environmental view of a hook section according to the present invention.

The lure attachment member 120 has a predetermined breaking strength. The lure attachment member 120 can be in the form of a continuous loop or band. The lure attachment member 120 is sufficiently flexible to allow a person to bend it back 180° (i.e., 180 degrees) on itself to double loop the eyelet 200 as shown in FIGS. 3A and 3B, thereby allowing the lure attachment member 120 to be secured, for example, to a split ring 145 of a lure 150.

The hook section 140 comprises at least one elongated shank 180, an eyelet 200, an eyelet guide 220, and at least one curved bend 240. The at least one elongated shank 180 defines first 260 and second 280 ends. The at least one elongated shank 180 may be straight or curved.

The lure attachment member 120 could be a band made of elastomeric compound such as, but not limited to, synthetic rubber compound with a selected breaking strain. For example, the lure attachment member 120 can be made out of olefinic elastomers such as EPDM (ethylene-propylene-diene monomer). For example, the lure attachment member 120 can be made out of ethylene-propylene copolymer (EPM). A lure attachment member 120 made out of a flexible elastomer compound could be squeezed or otherwise forced through gap 360 in eyelet 200.

For example, the lure attachment member 120 could be made out of a high ethylene-containing material may be any of the high ethylene-containing olefinic elastomers, such as ethylene-propylene (EP), ethylene-propylene-diene monomer (EPDM), ethylene-butene, ethylene-pentene, ethylene-hexene, ethylene-heptene, ethylene-octene, and the like, where the ethylene content of the high ethylene-containing elastomer is greater than about 50% by weight based on the weight of the elastomer; alternatively the ethylene content is about 70 to 95% weight based on the weight of the elastomer.

Alternatively, the lure attachment member 120 can be made out of any suitable material such as a plastic polymer, e.g., nylon, thermoplastic polyethylene, or Dacron (i.e., Polyethylene terephthalate).

The various parts of the hook section 140 can be made out of any suitable material such as metal. For example, the hook section 140 can be made from round wire made from carbon steel or stainless steel; however, other materials can be used and the wire can have a shape other than round in cross-section.

During normal use the fish lure break away system 100 is attached to a lure 150 and the lure 150 attached to a fishing line 155 (see FIG. 3B). The predetermined breaking strength of the lure attachment member 120 is selected to be less than the breaking strength of the fishing line 155 attached to the lure 150 (see, e.g., FIG. 3B). The predetermined breaking strength of the lure attachment member 120 can vary from 1 lb (one pound-mass) to 40 lbs (forty pounds-mass) in ½ lb (half pounds-mass) increments, i.e., 1 lb, 1.5 lbs, 2 lbs . . . 40 lbs). The predetermined breaking strength of the lure attachment member 120 is selected to be less than the breaking strain of the fish line 155. More specifically, the breaking strain is selected based on the final configuration of the lure attachment member 120 with respect to the eyelet 200 and the lure 150. For example, a double back configuration of the lure attachment member 120 is shown in FIG. 3B where the lure attachment member 120 is shown inserted once through a split ring 145 and attached twice to eyelet 200 (see FIGS. 3A and 3B) by threading the lure attachment member 120 through eyelet gap 360 and then through ring 145 and then once more through eyelet gap 360. Thus, if the fishing line 155 in FIG. 3B has a breaking strain of 10 lbs (ten pounds-mass) the lure attachment member 120 in the configuration shown in FIG. 3B can have a breaking strain of less than 10 lbs, e.g., 7 lbs (seven pounds-mass) and in this example the set-up shown in FIG. 3B could be used in fishing for fish of less than 7 lbs (seven pounds-mass).

For example, lure attachment member 120 with 6 lbs (six pounds-mass) breaking strength can be used in conjunction with a fishing line with 9 lbs (nine pounds-mass) breaking strength. Thus, if the hook becomes stuck in, for example, weeds the lure can be saved by applying sufficient load on the fishing line sufficient to break the lure attachment member 120, but not sufficient to break the fishing line attached to the lure.

Figure 4:
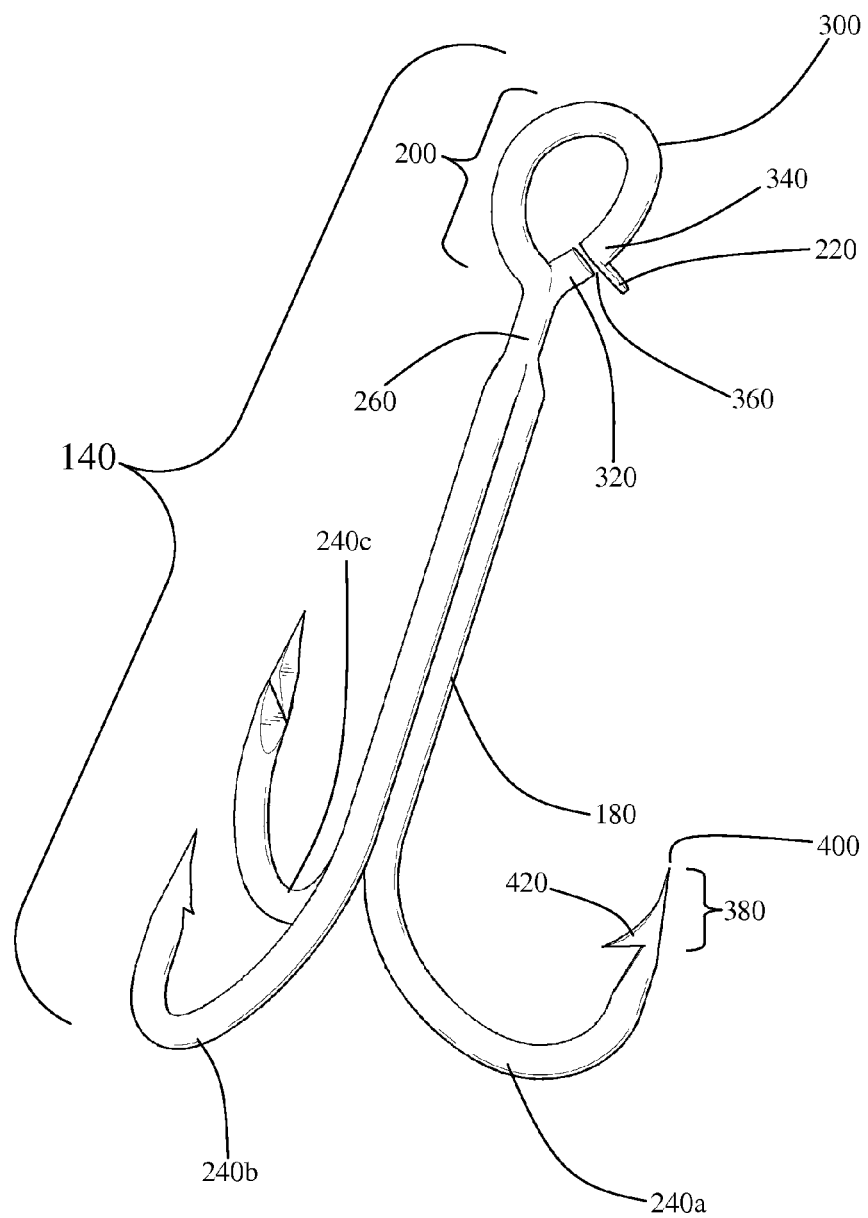
FIG. 4 shows a perspective view of a hook section according to the present invention.

The eyelet 200 defines a discontinuous loop 300 having first end 320 and second end 340. The first end 320 of the eyelet 200 is attached to and integral with the first end 260 of the at least one elongated shank 180, the second end 340 of the eyelet 200 is located proximate to but separate from the first end 260 of the at least one elongated shank 180 with an eyelet gap 360 interposed between the first 320 and second end 340 of the eyelet 200. The at least one curved bend 240 extends from the second end of the at least one elongated shank, and terminates in a tip section 380. The at least one curved bend 240 can comprise one, two, three or four curved bends. For example, FIG. 4 shows a hook section 140 with three curved bends labeled 240a, 240b and 240c.

The eyelet guide 220 extends from the eyelet 200. The eyelet guide 220 is located adjacent to the eyelet gap 360. In normal use the eyelet guide 220 helps guide a portion of the lure attachment member 120 through the eyelet gap 360 to secure the lure attachment member 120 to the hook section 140.

The at least one elongated shank 180 can be a single shank (corresponding to a single curved bend and tip section), two shanks (corresponding to two curved bends and two tip sections) or three shanks with evenly spaced curved bends and tip sections. Each curved bend terminates in a tip section. The tip section can be a sharp point 400 and optionally further comprises a barb 420 (see, e.g., FIG. 4).

For example, a double shank version of the at least one elongated shank 180 can be made by taking two curved bends with individual shanks attached to each curved bend and optionally brazing the two shanks together to provide the at least one elongated shank 180 and adding or fashioning a single eyelet 200 of the present invention to the first end 260 and placing a single eyelet guide 220 adjacent to the eyelet gap 360.

For example, a treble shank version of the at least one elongated shank 180 can be made by taking three curved bends with individual shanks attached to each curved bend and optionally brazing all three shanks together to provide the at least one elongated shank 180 and adding or fashioning a single eyelet 200 of the present invention to the first end 260 and placing a single eyelet guide 220 adjacent to the eyelet gap 360.

For example, a single shank version of the at least one elongated shank 180 can be made by taking a curved bend with an individual shank attached to each curved bend to provide the at least one elongated shank 180 and adding or fashioning a single eyelet 200 of the present invention to the first end 260 and placing a single eyelet guide 220 adjacent to the eyelet gap 360.

Figure 1:
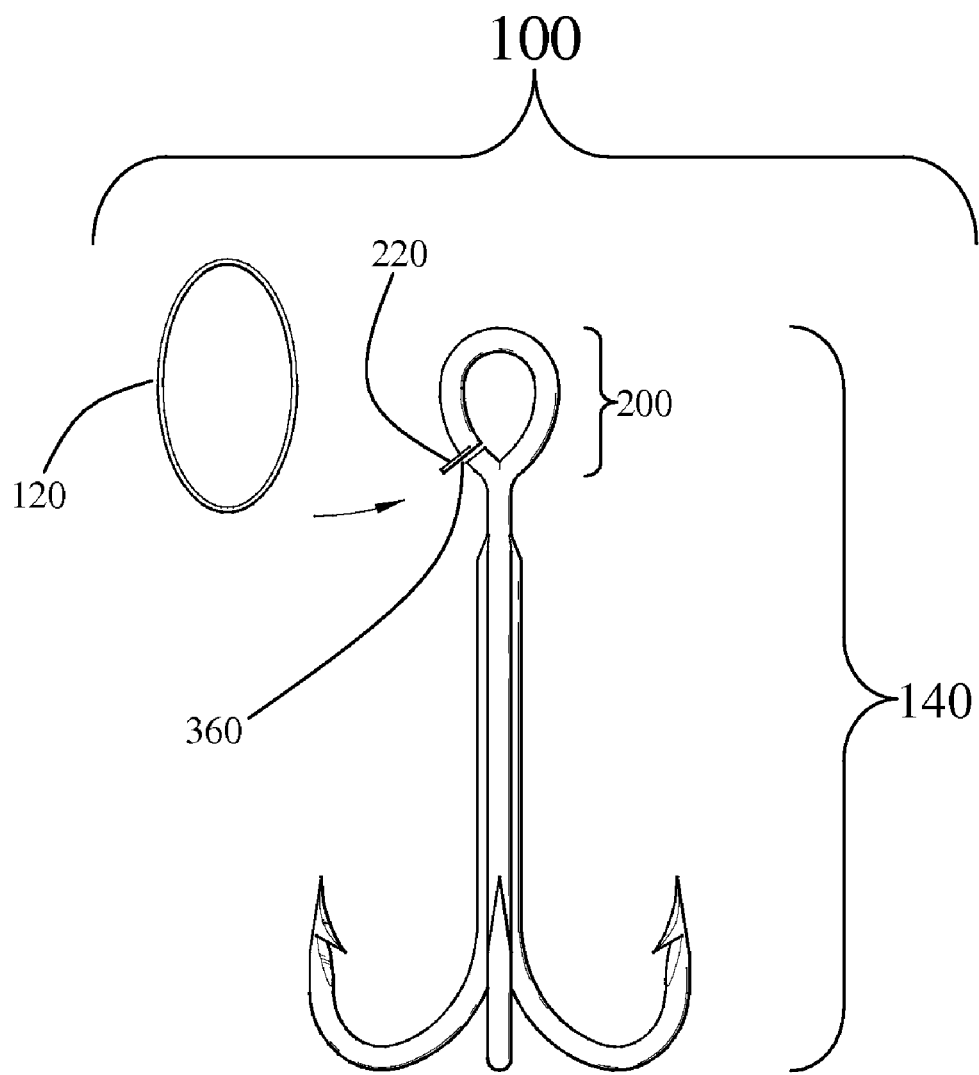
FIG. 1 shows a side view of one embodiment of a fish lure break away system according to the present invention.

In one embodiment the lure attachment member 120 has a predetermined thickness and the eyelet gap 360 has a predetermined width; the lure attachment member 120 can be a continuous loop or band as shown in, for example, FIG. 1. In this embodiment the predetermined width of the eyelet gap is about the same or slightly less than the predetermined thickness of the lure attachment member 120. In this embodiment a person can slide the lure attachment member 120 onto the eyelet 200 and thence thread the lure attachment member 120 through a lure's ring 145 and then bend the lure attachment member 120 back on itself to slide the lure attachment member onto the eyelet 200 for a second time thus attaching lure 150 to the eyelet 200 (see FIGS. 3A and 3B).

Referring now to the Figures with regard to which the meaning of labels and numbers shown in the Figures are described in Table 1 (see FIG. 11).

FIG. 1 shows a side view of one embodiment of a fish lure break away system 100 according to the present invention. The fish lure break away system 100 comprises a lure attachment member 120 and a hook section 140. The hook section 140 is adapted to attach directly to the lure attachment member 120. During normal use the lure attachment member 120 is attached to the eyelet 200 via eyelet gap 360.

Figure 2:
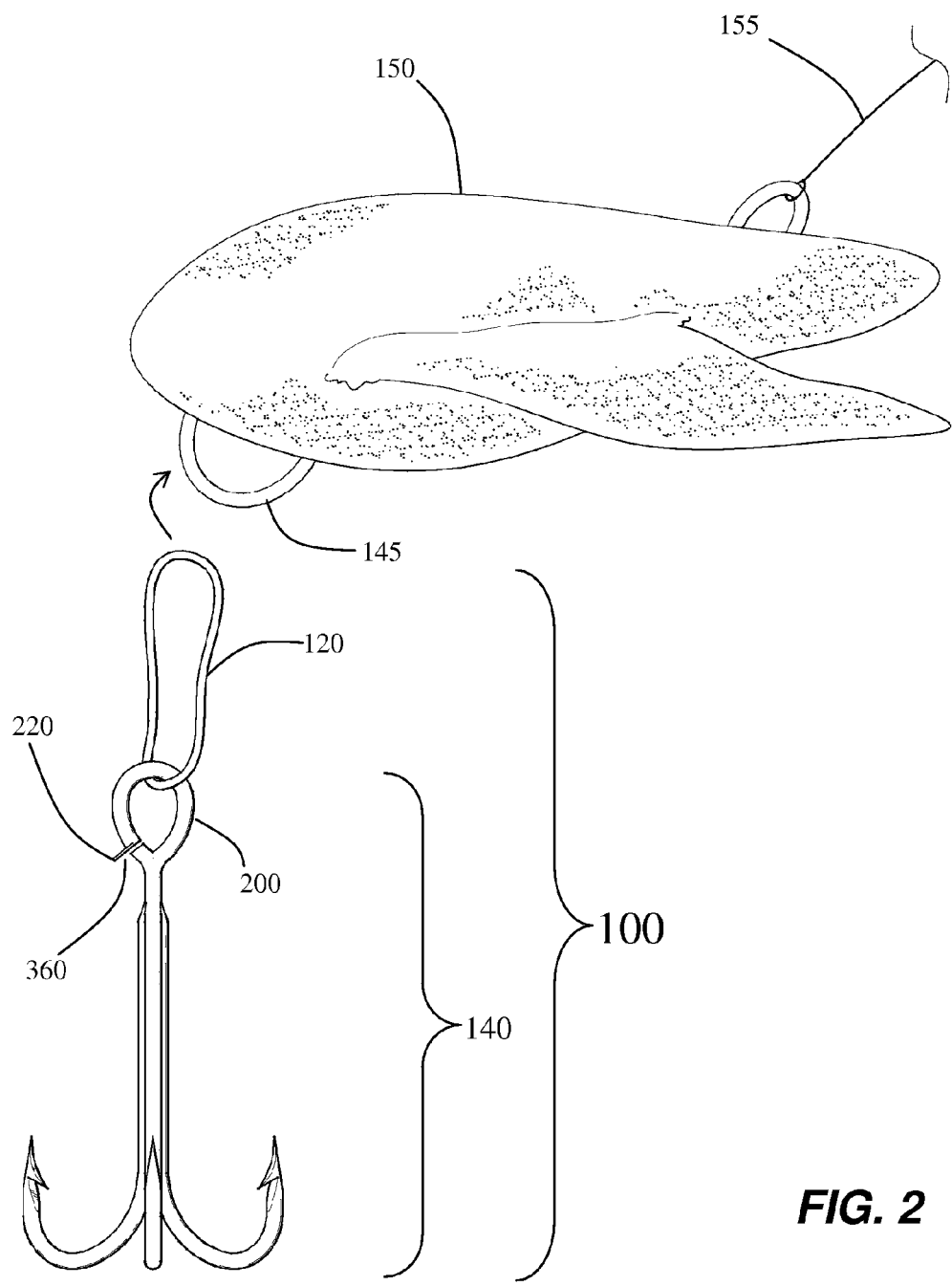
FIG. 2 shows an environmental view of a hook section according to the present invention.

FIG. 2 shows an environmental view of the fish lure break away system of FIG. 1. The lure attachment member 120 is shown attached to the eyelet 200 and about to be inserted or threaded through lure ring 145 of lure 150. Explanation of the part numbers shown in FIG. 2 are found in Table 1.

FIG. 3A shows an environmental view of the fish lure break away system 100. The lure attachment member 120 is shown attached to the eyelet 200 and inserted through ring 145 of lure 150. The lure attachment member 120 has been bent back and is ready to be inserted through eyelet gap 360 for a second time. Explanation of the part numbers shown in FIG. 3A are found in Table 1.

FIG. 3B shows an environmental view of the fish lure break away system 100. The lure attachment member 120 is shown attached to the eyelet 200 and ring member 145. Explanation of the part numbers shown in FIG. 3B are found in Table 1. Thumb or finger pressure can be optionally applied to eyelet guide 220 to increase or reduce the width of the eyelet gap 360.

FIG. 4 shows a perspective view of a hook section 140 according to the present invention. The illustrated hook section 140 is shown with three curbed bends 240 labeled: 240a, 240b, and 240c. Explanation of the part numbers shown in FIG. 3 are found in Table 1.

Figure 5:
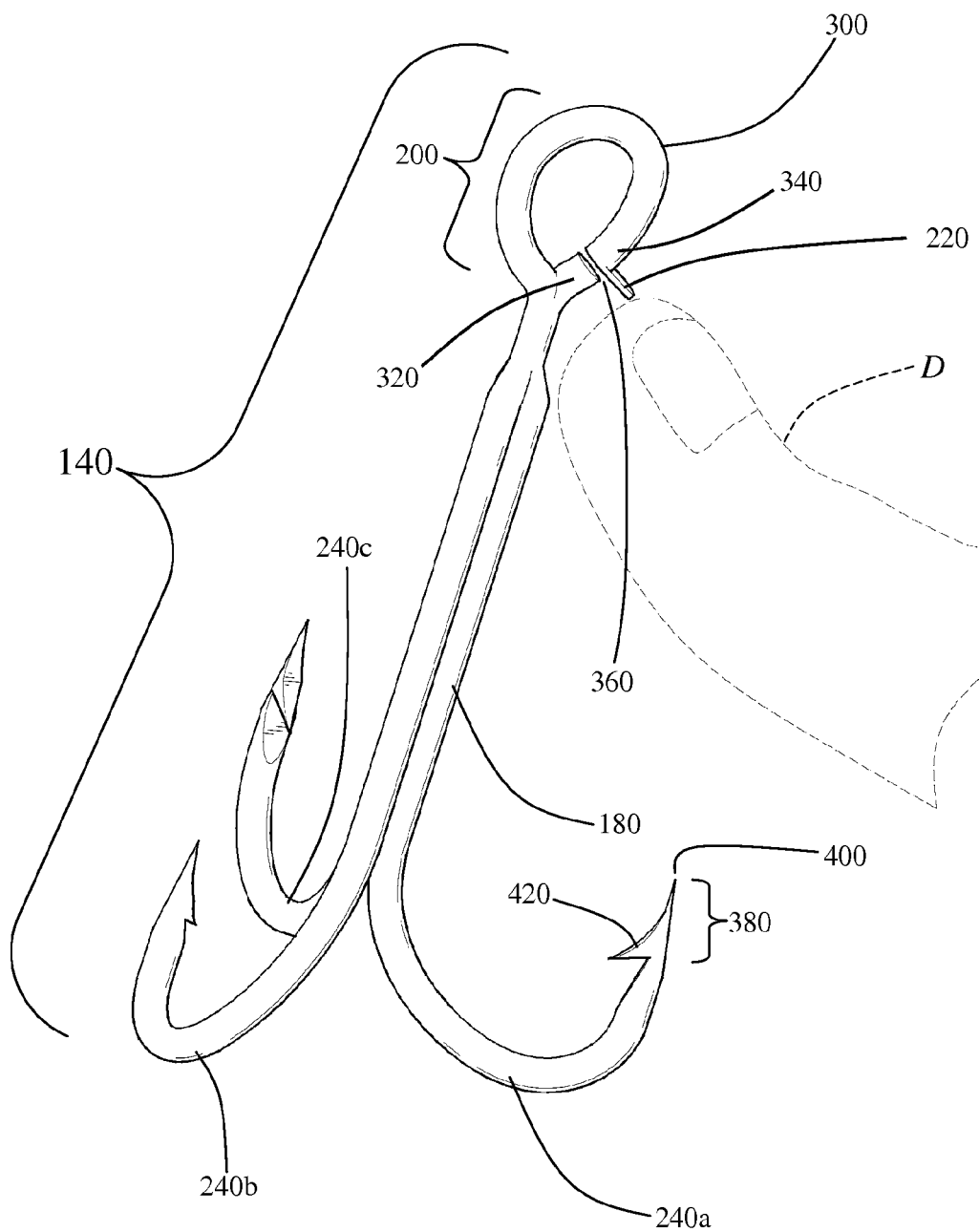
FIG. 5 shows an environmental perspective view of a hook section according to the present invention.

FIG. 5 shows an environmental perspective view of the hook section 140 part of the fish lure break away system. More specifically, a person's digit D (e.g., a finger or thumb) is about to apply pressure to the eyelet guide 220 in a direction away from eyelet end 320 the eyelet 200 responds such that the width of the eyelet gap 360 is increased until the eyelet gap 360 is wide enough to allow passage therethrough of the lure attachment member 120 (see FIG. 6). Explanation of the part numbers shown in FIG. 5 are found in Table 1.

Figure 6:
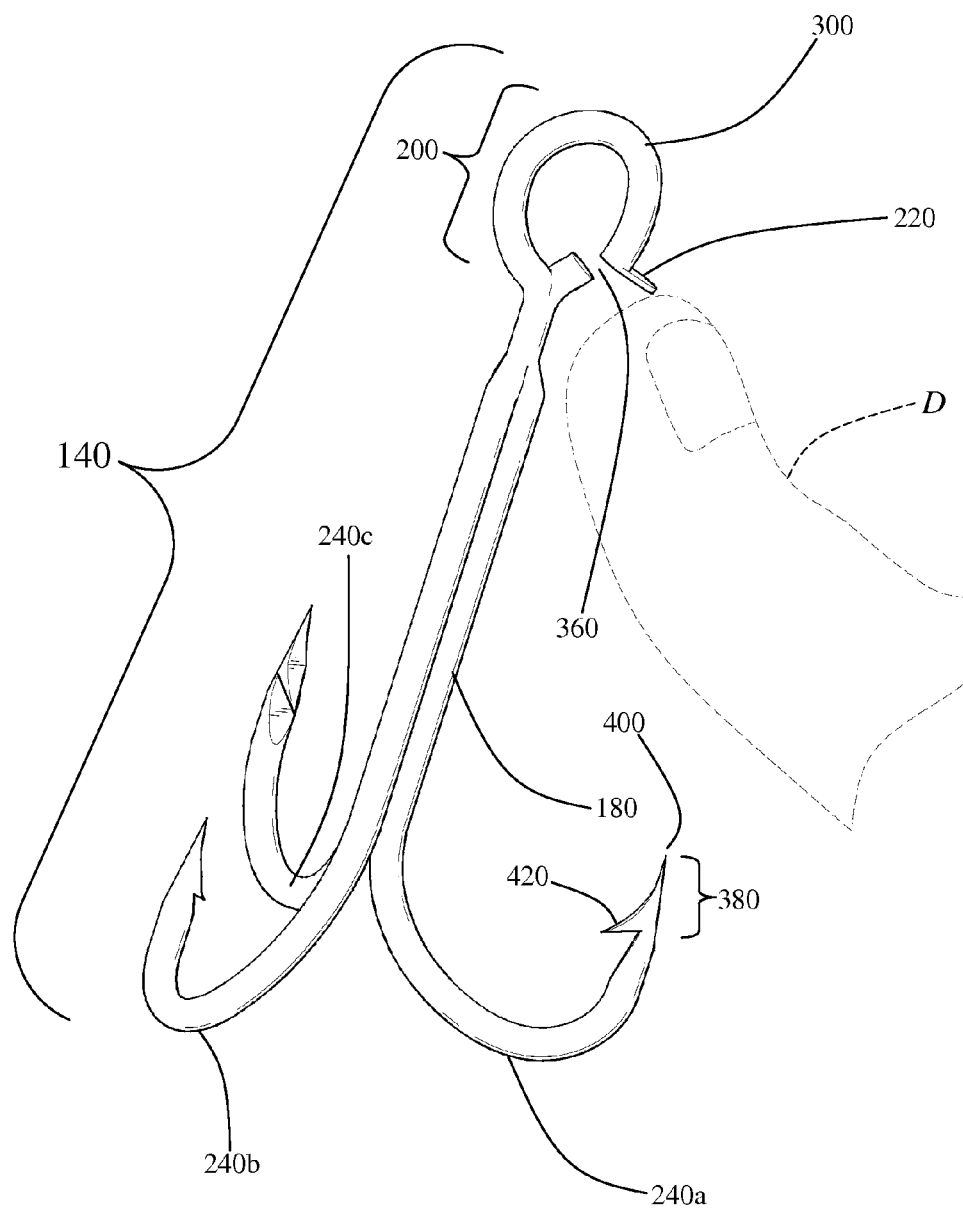
FIG. 6 shows an environmental perspective view of a hook section according to the present invention.

FIG. 6 shows an environmental perspective view of the hook section 140 part of the fish lure break away system. More specifically, a person's digit D (e.g., a finger or thumb) has widened the eyelet gap 360 sufficiently to allow a lure attachment member 120 (not shown in this figure) therethrough. Explanation of the part numbers shown in FIG. 6 are found in Table 1.

Figure 7:
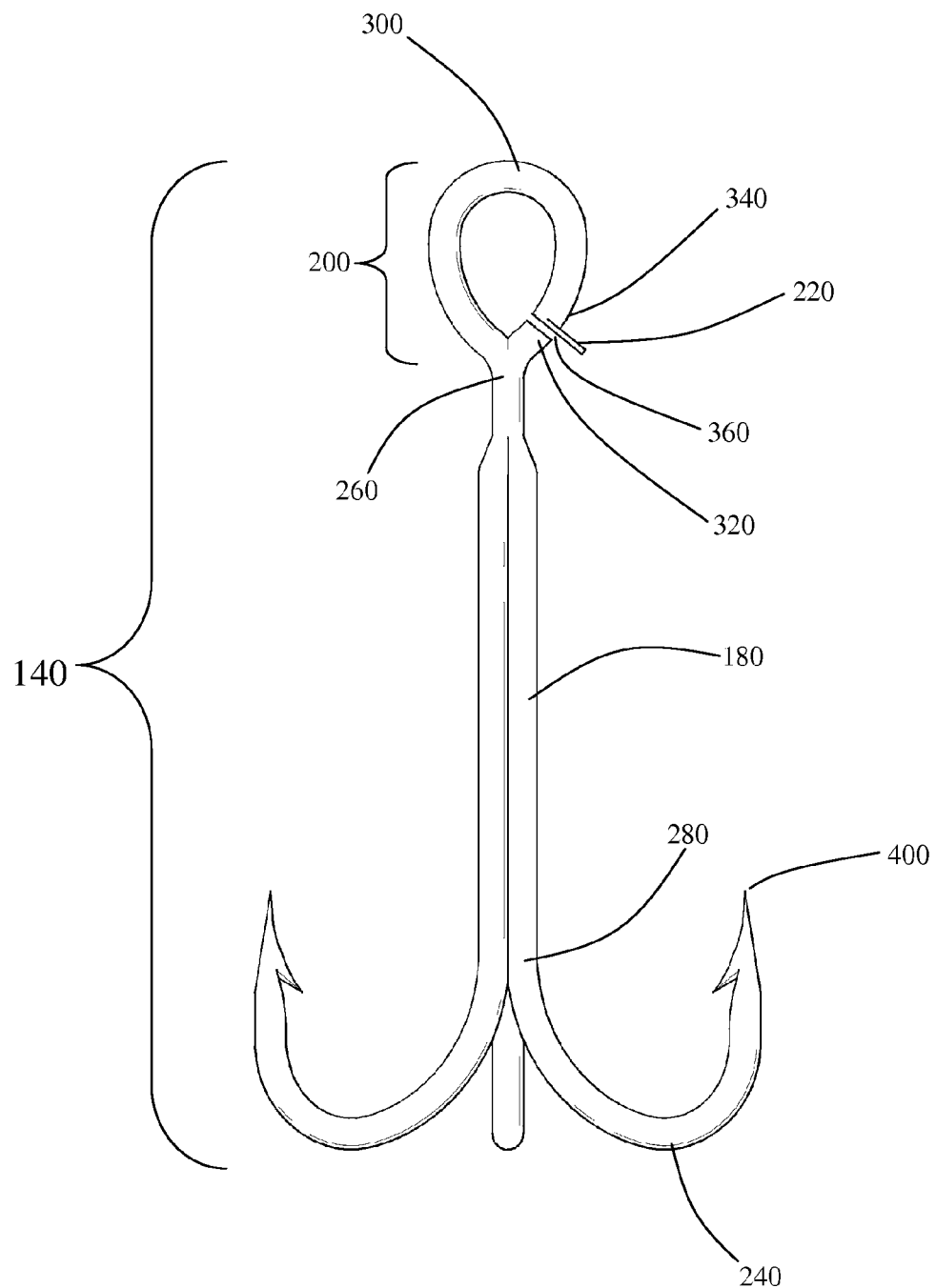
FIG. 7 shows a perspective view of a hook section according to the present invention.
Figure 8:
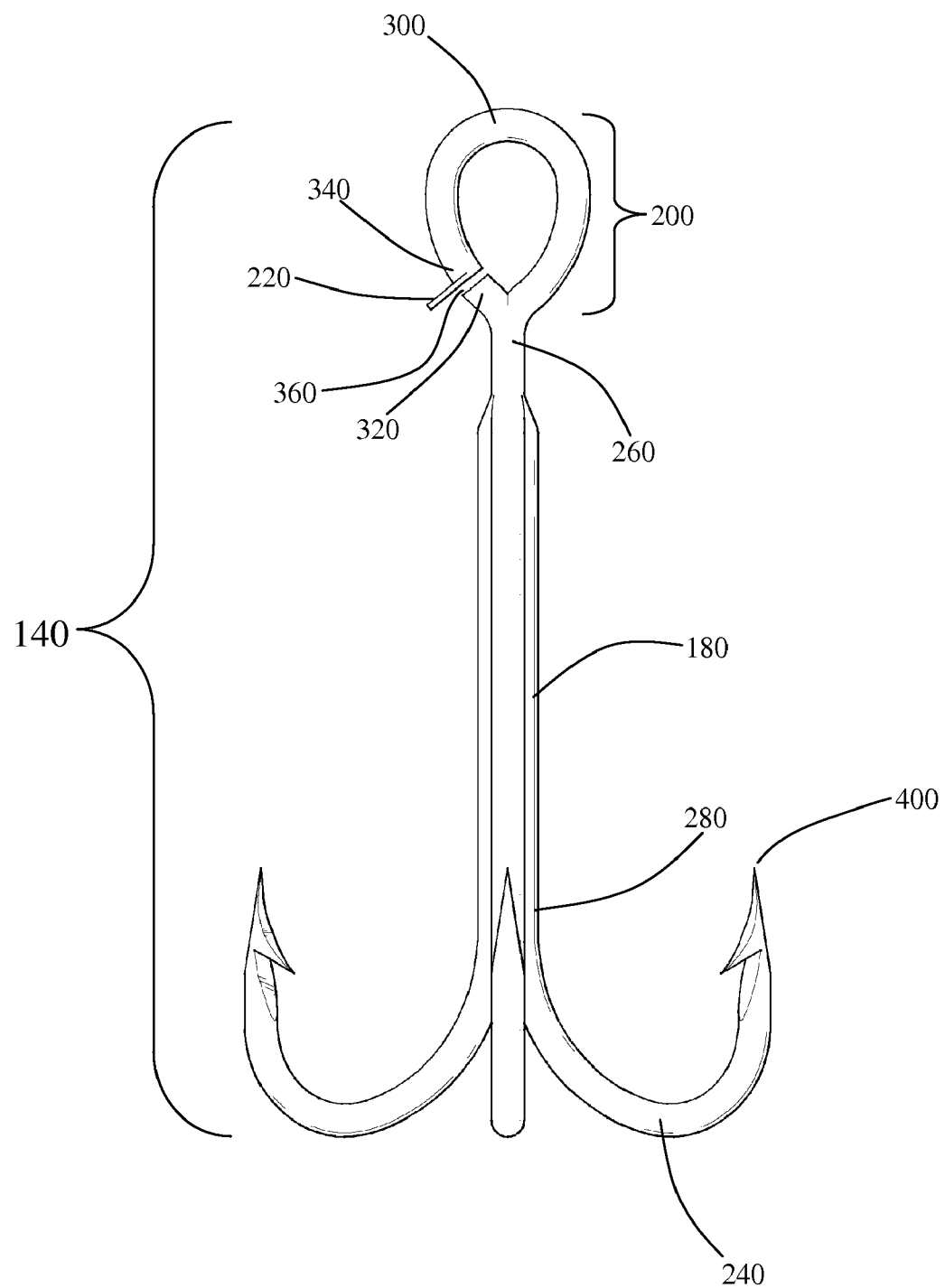
FIG. 8 shows an alternative perspective view of the hook section of FIG. 7.

FIGS. 7 and 8 show views of the hook section 140 according to the present invention; explanation of the part numbers shown in FIGS. 7 and 8 are found in Table 1.

Figure 9:
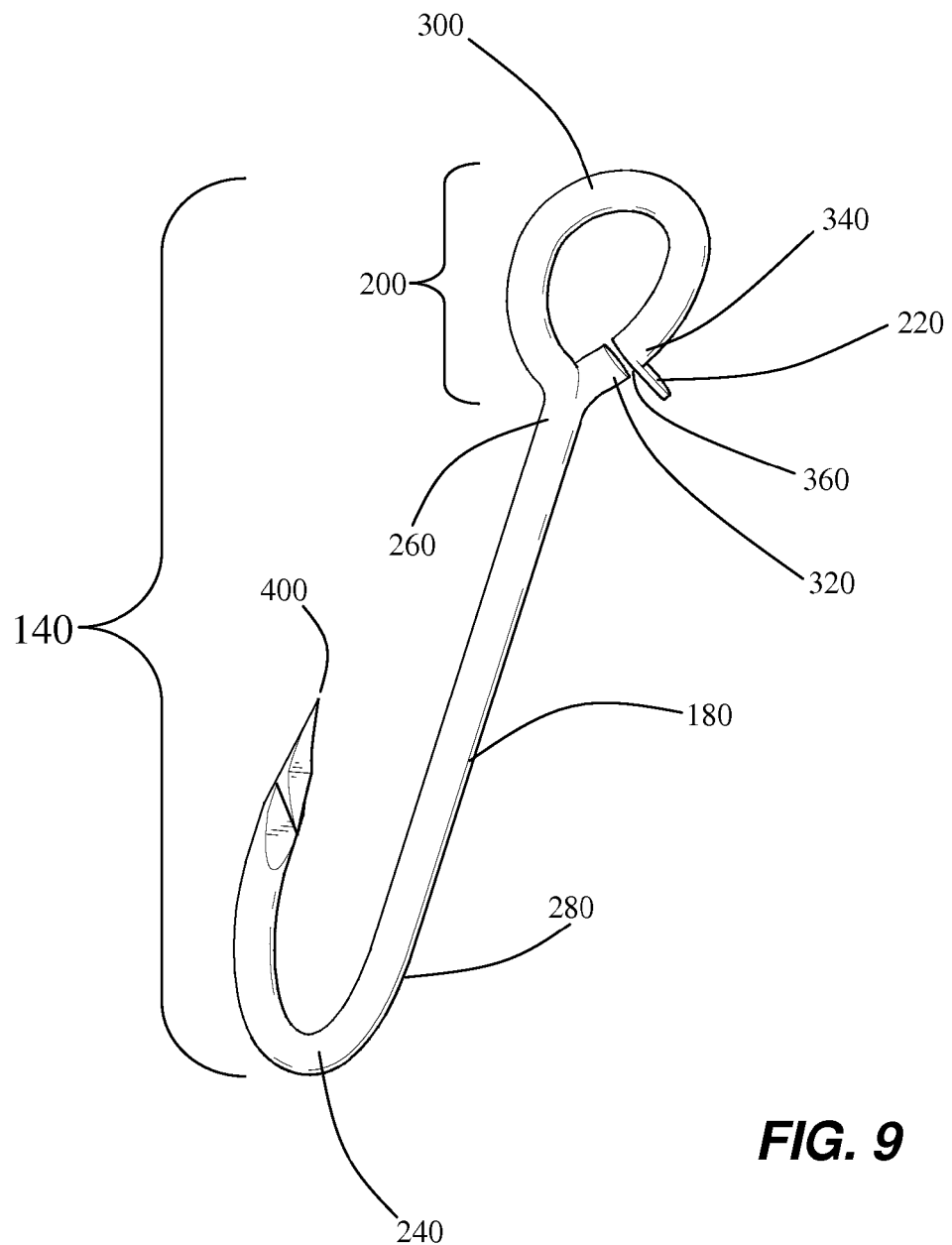
FIG. 9 shows a perspective view of a hook section according to the present invention.

FIGS. 9 and 10 respectively show perspective views of hook sections with one and two curved bends 240. Explanation of the part numbers shown in FIGS. 9 and 10 are found in Table 1.

FIG. 11 shows a table listing part numbers.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed:

1. A fish lure break away system for use with fishing apparatus including an artificial fish lure and a fishing line connected to the artificial fish lure, wherein the fishing line has a predetermined breaking strain, the system comprising:

a lure attachment member, wherein said lure attachment member comprises a continuous loop structure, said lure attachment member has a predetermined breaking strain less than the breaking strain of the fishing line, and said lure attachment member is sufficiently flexible to allow a person to bend said lure attachment member 180° back on itself, wherein said lure attachment member is an elastic band; and a hook section, said hook section comprising at least one elongated shank, an eyelet, an eyelet guide, and at least one curved bend, said at least one elongated shank defines first and second opposite ends, said eyelet is connected to said first end of said at least one elongated shank, and said at least one curved bend is integral with and extends from said second end of said at least one elongated shank, wherein said eyelet is a discontinuous loop having first and second ends, the first end of said eyelet is attached to and integral with the first end of said at least one elongated shank, the second end of said eyelet is located proximate to but separate from the first end of said at least one elongated shank with an eyelet gap interposed between the first and second ends of said eyelet, said eyelet gap extending generally parallel to said eyelet guide, said eyelet guide having a first end at the second end of said eyelet and a second distal free end spaced from an outer periphery of said eyelet such that said eyelet guide extends transversely from said second end of said eyelet, wherein said eyelet guide extends outward from said eyelet, wherein said eyelet guide is located adjacent to said eyelet gap, whereby in normal use said eyelet guide helps a user to guide a portion of said lure attachment member through said eyelet gap to secure said lure attachment member to said hook section, such that said lure attachment member is separable from and attachable to said eyelet by passing a portion of said lure attachment member through said eyelet gap, and wherein each of said at least one curved bend terminates in a tip section.

2. A fish lure break away system, comprising:

an artificial fish lure with a ring;

a lure attachment member, wherein said lure attachment member comprises a continuous loop structure, said lure attachment member has a predetermined breaking strength and is sufficiently flexible to allow a person to bend said lure attachment member 180° back on itself; and a hook section, said hook section comprising at least one elongated shank, an eyelet, an eyelet guide, and at least one curved bend, said at least one elongated shank defines first and second opposite ends, said eyelet is connected to said first end of said at least one elongated shank, and said at least one curved bend is integral with and extends from said second end of said at least one elongated shank, wherein said eyelet is a discontinuous loop having first and second ends, the first end of said eyelet is attached to and integral with the first end of said at least one elongated shank, the second end of said eyelet is located proximate to but separate from the first end of said at least one elongated shank with an eyelet gap interposed between the first and second ends of said eyelet, said eyelet gap extending generally parallel to said eyelet guide, said eyelet guide having a first end at the second end of said eyelet and a second distal free end spaced from an outer periphery of said eyelet such that said eyelet guide extends transversely from said second end of said eyelet, wherein said eyelet guide extends outward from said eyelet, wherein said eyelet guide is located adjacent to said eyelet gap, whereby in normal use said eyelet guide helps a user to guide a portion of said lure attachment member through said eyelet gap to secure said lure attachment member to said hook section, such that said lure attachment member is separable from and attachable to said eyelet by passing a portion of said lure attachment member through said eyelet gap, said eyelet being connectable to said ring by also inserting said lure attachment member through the ring of said artificial fish lure, and wherein each of said at least one curved bend terminates in a tip section.

3. The fish lure break away system of claim 2, wherein said lure attachment member is made of synthetic rubber.

4. The fish lure break away system of claim 2, wherein said lure attachment member is made of an elastomeric compound.

5. The fish lure break away system of claim 2, wherein said lure attachment member is made out of ethylene-propylene copolymer.

6. The fish lure break away system of claim 2, wherein said lure attachment member is made out of ethylene-propylene-diene monomer.

7. The fish lure break away system of claim 2, wherein said lure attachment member is an elastic band.

8. A fish lure break away system for use with fishing apparatus including an artificial fish lure and a fishing line connected to the artificial fish lure, wherein the fishing line has a predetermined breaking strain, the system comprising:

an artificial fish lure with a ring;

a lure attachment member, wherein said lure attachment member comprises a continuous loop structure in the form of a rubber band, said lure attachment member has a predetermined breaking strain less than the breaking strain of the fishing line, and said lure attachment member is sufficiently flexible to allow a person to bend said lure attachment member 180° back on itself; and a hook section, said hook section comprising at least one elongated shank, an eyelet, an eyelet guide, and at least one curved bend, said at least one elongated shank defines first and second opposite ends, said eyelet is connected to said first end of said at least one elongated shank, and said at least one curved bend is integral with and extends from said second end of said at least one elongated shank, wherein said eyelet is a discontinuous loop having first and second ends, the first end of said eyelet is attached to and integral with the first end of said at least one elongated shank, the second end of said eyelet is located proximate to but separate from the first end of said at least one elongated shank with an eyelet gap interposed between the first and second ends of said eyelet, said eyelet gap extending generally parallel to said eyelet guide, said eyelet guide having a first end at the second end of said eyelet and a second distal free end spaced from an outer periphery of said eyelet such that said eyelet guide extends transversely from said second end of said eyelet, wherein said eyelet guide extends outward from said eyelet, wherein said eyelet guide is located adjacent to said eyelet gap, whereby in normal use said eyelet guide helps a user to guide a portion of said lure attachment member through said eyelet gap to secure said lure attachment member to said hook section, such that said lure attachment member is separable from and attachable to said eyelet by passing said lure attachment member through said eyelet gap, and wherein each of said at least one curved bend terminates in a tip section.

* * * * *